United States Patent [19]

McKinney et al.

[11] 4,454,272

[45] Jun. 12, 1984

[54] SLIP AND BLOCK ADDITIVES FOR OLEFIN POLYMERS

[75] Inventors: Osborne K. McKinney; David P. Flores, both of Lake Jackson, Tex.

[73] Assignee: The Dow Chemical Company, Midland, Mich.

[21] Appl. No.: 495,020

[22] Filed: May 16, 1983

Related U.S. Application Data

[62] Division of Ser. No. 256,268, Apr. 28, 1981, Pat. No. 4,394,474.

[51] Int. Cl.³ ............................................. C08J 5/18
[52] U.S. Cl. ................................... 524/241; 524/425; 524/445; 524/448; 524/451
[58] Field of Search ............... 524/241, 425, 445, 448, 524/451, 232

[56] References Cited

U.S. PATENT DOCUMENTS

| | | | |
|---|---|---|---|
| 3,104,232 | 9/1963 | Clark et al. | 524/232 |
| 3,330,796 | 7/1967 | Mock et al. | 524/232 |
| 3,470,122 | 9/1969 | Ridgeway et al. | 524/425 |

*Primary Examiner*—Joseph L. Schofer
*Assistant Examiner*—N. Sarofim
*Attorney, Agent, or Firm*—W. J. Lee

[57] ABSTRACT

Extrusion-cast films of high molecular weight, linear low density ethylene copolymers which inherently have high block and low slip characteristics are compounded with a minor amount of a secondary fatty acid amide and a finely-divided natural inorganic, e.g., silica, before being extrusion-cast as a thin film, the additives serving to substantially reduce the block and increase the slip characteristics of the film.

14 Claims, No Drawings

SLIP AND BLOCK ADDITIVES FOR OLEFIN POLYMERS

Cross-Reference to Related Application

This is a divisional of application Ser. No. 256,268, filed Apr. 28, 1981, now U.S. Pat. No. 4,394,474.

BACKGROUND OF THE INVENTION

There are various high molecular weight olefin polymers and copolymers which are suitable in making extrusion-cast films for commercial purposes. Such extrusion-cast films are generally made by extrusion of the molten polymer through a slot-die onto revolving chilled rolls; the general technique is often referred to as "chill roll extrusion", "cast film extrusion", or "slot-die extrusion".

There are, basically, two types of olefin polymerization techniques for preparing high molecular weight olefin polymers and copolymers. The oldest commercial technique involves high pressure, high temperature, and the use of a free radical initiator, such as a peroxide; these type polymers are generally known as low density polyethylene (LDPE) and are also known as ICI-type polyethylenes. These LDPE polymers contain branched chains of polymerized monomer units pendant from the main polymer "backbone" and generally have densities in the range of about 0.910–0.935 gms./cc.

The other commercially-used technique involves coordination catalysts of the "Ziegler" type or "Phillips" type and includes variations of the Ziegler type, such as the Natta type. These catalysts may be used at very high pressures, but are generally used at very low or intermediate pressures. The products made by these coordination catalysts are generally known as "linear" polymers because of the substantial absence of branched chains of polymerized monomer units pendant from the main polymer "backbone", and they are also generally known as high density polyethylene (HDPE). It is these "linear" polymers to which the present invention pertains. Linear polyethylene (HDPE) ordinarily has a density in the range of 0.941 to 0.965 gms./cc.

In particular, the present invention pertains to "linear" type ethylene polymers wherein ethylene has been polymerized along with minor amounts of alpha, beta-ethylenically unsaturated alkenes having from 3 to 12 carbons per alkene molecule, preferably 4 to 8. The amount of the alkene comonomer is generally sufficient to cause the density of the polymer to be substantially in the same density range as LDPE, due to the alkyl side chains on the polymer molecule, yet the polymer remains in the "linear" classification; they are conveniently referred to as "linear low density polyethylene" (LLDPE). These polymers retain much of the strength, crystallinity, and toughness normally found in HDPE homopolymers of ethylene, but the higher alkene comonomers impart high "block" characteristics to extrusion-cast films and the high "slip" (i.e. low coefficient of friction) characteristic inherently found in HDPE is diminished.

Slip and antiblock agents are often added to LDPE film compounds to insure proper film handling characteristics. "Slip", basically defined as the coefficient of sliding friction, may be adjusted by incorporating certain additives, e.g., fatty acid amides. "Blocking", the tendency of film to stick to itself, can be reduced by adding finely divided inorganic fillers such as silica. HDPE homopolymers with densities of above about 0.940 gm./cc. generally show good slip properties (that is, they slide across each other with ease), and slip agents are not normally required.

Closely related art is found, e.g., in U.S. Pat. Nos. 2,991,265; 3,324,060; 3,463,751; 3,470,122; 3,595,827; and 3,362,839.

Other art, believed to be of less relevency is found, e.g., in U.S. Pat. Nos. 3,658,980; 2,879,244; 3,070,462; 3,121,914; 3,387,073: and 3,499,950.

SUMMARY OF THE INVENTION

Extrusion-cast films of certain high molecular weight, linear low density ethylene copolymers which inherently have high block and low slip characteristics are compounded with a secondary fatty acid amide and a finely divided naturally-occurring inorganic powder, such as silica, before being extrusion-cast as a thin film. The additives serve to substantially reduce the block and increase the slip characteristics of the film.

DETAILED DESCRIPTION OF THE INVENTION

The high molecular weight, linear low density ethylene copolymers within the purview of the present invention are those made under conditions which are conducive to preparation of linear polymers such as by the well-known Ziegler or Phillips processes. The instant ethylene polymers contain minor amounts (generally about 5% to about 20% by weight) of at least one alpha-olefin comonomer selected from the group consisting of propylene, 1-butene, 1-isobutene, 1-pentene, 1-isopentene, 1-hexene, 1-isohexene, 1-heptene, 1-isoheptene, 1-octene, 1-isooctene, 1-nonene, 1-isononene, 1-decene, 1-isodecene, and the like. The amount of comonomers used is enough to result in polymer densities in the low range of about 0.90–0.94 gms./cc. The instant copolymers are also characterized as being high molecular weight, having a melt index (melt flow) in the range of about 0.1 gm/10 min. as measured by ASTM-D-1238 condition (E) to about 20 gms./10 min. as measured by ASTM-D-1238 condition (D), and as having, inherently, high block and low slip characteristics. Such polymers are ideally suited for use where high or moderate strength, extrusion-cast films are used as packaging materials, but the high block is detrimental when the film is manufactured in the customary manner involving large rolls, especially when rolled at very warm conditions. During shipping and/or storage, the high block polymers tend to adhere layer-to-layer with such a strong adhesion force that unrolling the film often causes distortion, and even tearing, of the film especially if the film is very thin. It appears that when enough of the higher alkene comonomers are used in the linear ethylene copolymer to result in a relatively low density polymer (i.e., about 0.90 to about 0.94 gms./cc), the pendant alkyl groups provide surface phenomena or surface properties which result in high block and low slip. The nature of this phenomenon is not fully understood. The phenomenon is observed even on cast films of the subject polymers when employed as a "core" layer between two very thin outer layers of ordinary LDPE.

The term "block" is used here to describe the adhesion of two layers of the film to each other by the application of even slight compression and where pulling apart of the layers is likely to create even small changes in the film and/or handling problems. Such "blocking" is also somewhat dependent on, or responsive to, the amount of compression applied as well as to the duration of the compression and to the temperature. "Destructive block" refers to tendencies to form substantially irreversible adhesion where peeling apart is likely to cause deformation or tearing of the film; such "destructive block" can occur even when compression forces are small, such as when rolls of the film are made during manufacture, especially when the rolls are prepared, stored, or shipped under very warm or hot conditions.

It is an object of the present invention to substantially reduce the blocking characteristics in the above-described polymers, thereby improving the handling characteristics of cast-extruded films prepared from the polymers.

It is a further object to increase the slip, i.e., to decrease the coefficient of friction of films cast-extruded from the polymers.

These and other objects are substantially attained by incorporating into the above-described polymers certain additives, as described below, prior to extrusion-casting the thin film product.

The compositions of the present invention comprise the LLDPE containing, generally, about 0.05 to about 1.5 weight percent, preferably about 0.1 to about 0.5 weight percent, of the secondary fatty acid amide along with about 0.02 to about 2.0 weight percent, preferably about 0.15 to about 0.6 weight percent, of the finely-divided naturally-occurring inorganic. The additives are more fully identified hereinafter. By using both additives, better results are obtained in both block and slip improvement than when each is employed independently, in different samples, for either or both of these purposes. In other words, the inorganic appears to amplify or improve the ability of the amide additive to lower the coefficient of friction and the amide appears to amplify or improve the ability of the inorganic to reduce the block. The compositions may be prepared by mixing a concentrated masterbatch with virgin polymer such as described hereinafter.

The secondary fatty acid amides useful in the present invention conform essentially to the empirical formula

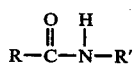

where R and R', independently, represent alkyl groups having 10 to 26 carbon atoms, both of which may be saturated or unsaturated alkyls, or one of which may contain olefinic unsaturation. These secondary acid amides are polar compounds which are both hydrophilic and lyophilic; in other words they are "amphipathic".

Compounds which conform to the above empirical structure are, e.g., oleyl palmitamide, stearyl erucylamide, stearyl stearamide, erucyl erucylamide, oleyl erucylamide, and the like. Other compounds which conform to the structure are, e.g., those wherein R and/or R' represent the following groups:

| | |
|---|---|
| erucyl | behenyl |
| linoleyl | arachidyl |
| linolenyl | stearyl |
| arachidonyl | palmityl |
| palmitoleyl | lignoceryl |
| elaidyl | oleyl |
| vaccenyl | |

The naturally-occurring inorganic minerals are, e.g., clay, diatomaceous silica, talc, and limestone, with the siliceous mineral being preferred. The inorganic should have an average particle size in the range of about 0.02 to about 40 microns, a surface area of about 0.7 to about 100 $m^2/gm$, and an oil absorption value of about 21 to about 175 parts of oil per 100 parts inorganic.

A masterbatch of the LLDPE with high loadings of the secondary amide and the naturally-occurring inorganic mineral may be blended or "let-down" with additional quantities of polyethylene to achieve the desired loading in films fabricated from the blend. For instance, about 100 parts of a masterbatch of LLDPE, containing about 4% of the secondary amide and about 1.5% of the mineral, may be blended with additional polymer to give a total blend of about 2000 parts containing about 2000 ppm amide and about 750 ppm mineral. This masterbatch technique may be used with LDPE, HDPE, LLDPE, or other olefin polymers or copolymers.

Films of LLDPE prepared in the practice of this invention contain from about 96.5 to about 99.93 weight percent of polymerized olefins and from about 0.07 to about 3.5 weight percent of the mixture of additives. While effective amounts and preferred concentrations of the additives vary somewhat with the density of the LLDPE, the amount of block-reduction and slip desired, and the smoothness of the film surface, generally preferred concentrations of the mixture of additives for the purposes of the invention range from about 0.25 to about 1.1 weight percent. As a rule the smooth surface films require more additives for a given amount of block-reduction than do the rough surface films, e.g., an embossed film. For example, whereas a particular smooth surface linear LDPE film may require as much as about 1.0 to 1.5 weight percent of the amide to give a certain block-reduction, only about, say, 0.05–0.09 weight percent of the same amide may be sufficient to give the same block-reduction in an embossed film.

The films according to this invention are readily prepared by (1) intimately admixing the olefin copolymer with the additives and (2) extruding the resulting mixture in the form of a clear, flexible sheet which is subsequently cooled in a draw-down procedure to form a film having an average thickness in the range of about 0.3 mil to about 8.0 mils. The thin sheet is extruded and drawn onto a chill roll. Somewhat different results are usually obtained in films made by the well-known blown-bubble technique, however the present additives are also useful in such blown films. The linear low density ethylene polymers may also be co-extruded with ordinary ethylene polymers so that the ordinary polymers form very thin outer, adhered layers on one or both sides of the linear low density polymers.

Mixing of the required components is readily carried out in a conventional mixing apparatus such as a Banbury mixer or screw type extruder. In one embodiment wherein the mixing device is a screw type extruder, the additives are fed into the barrel of the extruder. The extruded mixture may be mixed with additional polymer(s) prior to final extrusion or may be fed directly into an extruder equipped with a sheet die and extruded in the form of a transparent flexible sheet. In one extrusion operation the transparent sheet is extruded onto a chill roll and is drawn down to form a film having the desired thickness, usually between about 0.3 to about 8.0 mils (1 mil=0.0254 mm.). Suitable extrusion apparatus include a typical screw type extruder, an extruder equipped with a ramming device and the like.

In a preferred embodiment the mixing and extruding steps are carried out in a single apparatus which is a typical screw type extruder that is equipped with a sheet die and feed means placed along the extruder barrel which houses the screw or screws of the extruder. The block-reducing additive and the slip-improving additive are introduced as the polymer is being extruded at a rate such that a constant mixture is maintained. Similarly, concentrated masterbatches can be added to virgin material in the screw-type extruder.

The effect of various additives on slip and block characteristics of the polymer are tested by incorporating the additives into the polymer and extrusion-casting the mixture into film.

In the absence of any available or suitable ASTM test for measuring the block properties in the present invention, the following tests were devised:

A balanced beam is provided with an empty water-reservoir dangling from one end and a 3.75" by 3.75" by 1" block (about 14 in.$^2$ face) dangling from the other end. Immediately below the said 14 in.$^2$ block is a similar 14 in.$^2$ block, the two 14 in.$^2$ flat surfaces barely touching together when no weight is applied to either end of the balanced beam. The lower block is fixed and does not move. The balanced beam rests on a blade-edge fulcrum and is very sensitive to small weights. Two film specimens, each measuring about 6" by 6" are brought together so that a complete side (face) of one specimen is totally against a complete side (face) of the other. The so-formed 2-ply specimen of 6" by 6" dimension is centered between the two 14 in.$^2$ blocks (while the beam is restrained from moving) with the two blocks touching the upper and lower surfaces of the 2-ply specimen. The protruding edges of the 2-ply specimen are separated from each other by hand, the freed edges of the upper ply being affixed in some manner (e.g., rubber band or an adhesive) to the outer edges of the upper block and the freed edges of the lower ply being affixed to the outer edges of the lower block, leaving the 14 in.$^2$ portion of the 2-ply specimen still clinging, ply-to-ply, between the blocks. When the specimen is ready for testing, the restraint on the beam is removed and water is rapidly dripped into the reservoir on the other end of the beam. For consistency from test to test, the rate of water dripping is substantially consistently at a rate such that the drips are too fast to be easily counted. When the two plys of film become parted the water addition is stopped and the weight of water in the reservoir is determined in grams. For "ordinary block", the two plys of film are merely brought together (excluding air bubles) in such a manner that not more than negligible compression is used. For "induced block" a compression force of 4.12 pounds is applied for 24 hours at ambient room conditions (23° C., 50% R.H.) by putting a 5"×5" flat steel plate (4.12 lbs.) on top of the 2-ply specimen, using Mylar plastic sheets on each side of the 2-ply specimen to avoid any unwanted blocking or clinging to the table top or to the steel plate; this compression force is about 0.1648 lbs./in.$^2$ (or about 11.6 gms./cm$^2$). After this the 2-ply sample is positioned between the blocks of the test apparatus and fastened to the blocks and tested as described above. "Induced hot block" is tested the same way as above except that the pressure of the steel plate is maintained for 24 hours at a temperature of, 60° C. in a temperature-controlled oven. Each test of block is repeated a plurality of times and the results averaged; in this specification the block values reported are the average of 4 specimens unless otherwise noted.

Induced "hot block" is an accelerated test made to simulate extended warehouse (or other) storage conditions where ambient temperatures can reach as high as about 140° F. (60° C.) on hot days.

For purposes of description in this disclosure, the following "block" ranges are arbitrarily assigned for the relative results obtained by experience using the above-described block tests:

| Approximate Block Range | Relative Effect |
|---|---|
| up to about 50 | this is a good, acceptable range which generally gives no handling or "peel-off" problems with rolls or stacks of films. |
| about 50–150 | this is a "high block" range where one may encounter some handling problems and slower "peel-off" rates with rolls or stacks of films. |
| about 150–550 | this is an "excessive block" range wherein handling problems are very pronounced and where "peel-off" of rolls or stacks is seriously hampered; in some cases one may encounter "destructive" block, such as with very thin films which easily tear or stretch. |
| above about 550 | "destructive" blocking is most likely encountered, making handling or peel-off of stacks or rolls practically hopeless. |

When a reduction in block is made there is an accompanying improvement in handling.

Measurements for slip angle and coefficient of friction are made as follows:

Slip angle is measured on an inclinable flat, smooth plane equipped with a driving means which lifts one end of the plane through an increasing angle of 2.5° per second. A 1000-gm stainless steel block of 4"×2.5"×0.75" thick is used as the sample holder. Film samples are conditioned in the testing lab at about 23° C. and 50% R.H. for 8 hours before testing. A 4"×6" sample film specimen is affixed to the lower side of the steel block by using adhesive tape on the film edges on top of the steel block; it is mounted so that the machine-direction of the film is aligned along the 4" direction of the steel block and along the path of slip. For film-to-film testing, another film specimen is affixed to the inclinable surface and the film on the steel block is placed on that. For film-to-metal testing, a smooth metal plate is used on the plane. A limit switch is affixed to the inclinable plane approximately 0.25" from the steel block. As the plane is elevated at one end and the steel block slips down the plane, it actuates the limit switch which stops the driving force and the angle (from horizontal) is measured. Ordinarily three tests are made and the average is recorded as the slip angle.

Coefficient of friction is measured on a flat, highly-polished horizontal metal plane using a specimen "sled", a strain cell with 0–300 gram range connected to a 10 millivolt recorder, and a driving force which moves the plane at the rate of 1 inch per 11 seconds. The sled is a 200-gram, 2.5"×2.5"×0.25" thick flat slab of stainless steel with the bottom surface covered with a sheet of sponge rubber. The film specimen, 4"×4", is conditioned at 23° C. and 50% R.H. for 8 hours before testing and affixed against the sponge rubber surface of the sled and is attached to the strain cell. Film-to-film measurements are made by affixing another specimen of the film onto the horizontal plane; film-to-metal measurements are made by placing the sled (with the sample affixed thereto) directly on the metal plane. The driving force moves the plane horizontally and the sled is held stationary by the strain cell. The pulling force against the strain cell, caused by friction between sled and plane, is recorded. The initial maximum peak reading is taken as the "static" force at which relative movement between the film surfaces begins. "Kinetic" force, the amount of force required to maintain the relative movement after it has started, is taken as the average of 7 one-inch spaced readings from the recorder. The static and kinetic coefficients of friction (C.O.F.) are computed by the following equations:

$$\text{static } C.O.F. = \frac{\text{static force}}{200}$$

$$\text{kinetic } C.O.F. = \frac{\text{sustained motion force}}{200}$$

The "heat seal range" is determined by heat-sealing two plies of the film (usually having a film thickness in the range of 1.5 to 5.0 mils) by pressing (clamping) the films together using a heated bar with a TEFLON polymer surface beneath the films. Sealing is tested over a range of temperatures at 10° F. intervals, each test being made on a different portion of the films. Pressing (clamping) time for the heated bar against the films is: seconds=two-thirds of film thickness. Thus, e.g., a film 1.5 mils thick is heat-clamped for 1 second, and a film 3.0 mils thick is heat-clamped for 2 seconds. A "bad seal" is one which can be separated without tearing the film. A "good seal" is one which cannot be separated completely without tearing the film. "Burn-throughs" can occur when the temperature is too high. The temperature range over which "good" seals are obtained is taken as the heat seal range.

The following examples are given as illustrations of the invention and are not to be construed as limiting its scope. Throughout this specification and claims, all parts and percentages are by weight unless otherwise indicated.

EXAMPLE 1

A slot die-cast film was prepared by compounding the following materials at 350° F. (∼177° C.) on a 2.5", 20/1, L/D compounding extruder equipped with a metering, compression and mixing section.

49.675 lbs. of LLDPE (∼8% 1-octene, 2.3 M.I., 0.917 gm/cc)
0.150 lbs. of oleyl palmitamide
0.175 lbs. of finely-divided diatomaceous silica The polymer was obtained as pellets from the compounder and the pellets were fabricated into 1.0 mil film on a 3.5" MPM, 16/1, L/D extruder equipped with a 28" longitudinal slot die at 510° F. plastic temperature using a 6" air gap. The film was cooled by a series of three chill rolls at 60° F. and hauled off at 125 ft./min. The resultant block value of the slot die-cast film was 1.0 gram; the induced (hot) block value was 66.9 grams; the film-to-film static/kinetic dynamic slip value was 0.27/0.22 C.O.F.; the film-to-metal, static/kinetic dynamic slip value was 0.26/0.24 C.O.F.; and the film-to-film/film-to-metal slip angle was 14.7/20.2 degrees.

In contrast thereto the polymer without the additives, but otherwise handled and extruded as above, had a block value of 83.6 grams; an induced (hot) block value of 139 grams; a film-to-film, static/kinetic dynamic slip value of >1.40/>1.40 C.O.F.; a film-to-metal static/kinetic dynamic slip value of >1.40/>1.40 C.O.F.; and a film-to-film/film-to-metal slip angle of >62/>62 degrees.

EXAMPLE 2

In similar manner to Example 1 above, using the same polymer, amide and silica, the following data are obtained:

| Run | amide ppm | silica ppm | film-to-film, COF static | kinetic | induced hot block, g. |
|---|---|---|---|---|---|
| 1 | 2000 | 3500 | 0.21 | 0.17 | 116.8 |
| 2 | 2000 | none | >1.40 | >1.40 | 120.6 |
| 3 | none | none | >1.40 | >1.40 | 139.0 |

EXAMPLE 3

In similar manner to Example 1 above, using the same polymer, but using no amide and using three different finely-divided natural inorganics, the following data are obtained:

| Run | ppm inorganic silica | talc | limestone | film-to-film, COF static | kinetic | induced hot block, g |
|---|---|---|---|---|---|---|
| 1 | 6000 | none | none | 0.77 | 0.75 | 69.2 |
| 2 | none | 6000 | none | 1.07 | 1.14 | 151.3 |
| 3 | none | none | 6000 | >1.40 | >1.40 | 141.5 |

EXAMPLE 4

In similar manner to Example 1 above, using the same polymer and using the same diatomaceous silica, but using stearyl erucamide as the amide, the following data are obtained:

| Run | amide ppm | silica ppm | film-to-film, COF static | kinetic | induced hot block, g. |
|---|---|---|---|---|---|
| 1 | 3000 | 3500 | 0.26 | 0.22 | 20.2 |
| 2 | 2000 | 3500 | 0.27 | 0.22 | 66.9 |
| 3 | 2000 | none | >1.40 | >1.40 | 99.3 |
| 4 | 6000 | none | >1.40 | >1.40 | 70.6 |

EXAMPLE 5

In similar manner to Example 1 above, using the same polymer and silica, but using stearyl stearamide as the amide, the following data are obtained:

| Run | amide ppm | silica ppm | film-to-film, COF static | kinetic | induced hot block, g. |
|---|---|---|---|---|---|
| 1 | 3000 | 3500 | 0.89 | 0.80 | 64.4 |
| 2 | 2000 | none | >1.40 | >1.40 | 129.9 |
| 3 | 6000 | none | >1.40 | >1.40 | 46.1 |

EXAMPLE 6

In similar manner to Example 1 above, but using stearyl erucamide as the amide, and using the same silica, the polymer of Example 1 is compared with a LLDPE of 4% 1-octene, 2.5 M.I., and 0.935 gm./cc density. The data are shown below wherein Polymer A is the same as in Example 1 above and Polymer B is as identified immediately above.

| Run | Polymer | amide ppm | silica ppm | film-to-film, COF static | kinetic | induced hot block, g. |
|---|---|---|---|---|---|---|
| 1 | B | none | none | 0.67 | 0.55 | 0.2 |
| 2 | B | 3000 | 3500 | 0.14 | 0.14 | 3.5 |
| 3 | A | 3000 | 3500 | 0.26 | 0.22 | 20.2 |

The above data illustrates that even though Polymer B having a density of 0.935 was improved by addition of the amide and silica, it already had fairly good block and slip characteristics and was not in great need of improvement.

EXAMPLE 7

In similar manner to the above examples, a LLDPE of 8% 1-octene, 2.3 M.I. and 0.917 gm./cc density was tested with stearyl erucamide, finely-divided diatomaceous silica (A), and finely-divided natural talc (B). The data are as follows:

| Run | amide ppm | inorganic, ppm silica | talc | film-to-film, COF static | kinetic | induced hot block, g. |
|---|---|---|---|---|---|---|
| 1 | none | none | none | >1.4 | >1.4 | 142.8 |
| 2 | 3000 | 3000 | none | 0.21 | 0.19 | 10.2 |
| 3 | 3000 | none | 3000 | 0.19 | 0.22 | 13.0 |

EXAMPLE 8

In similar manner to the above examples, using LLDPE of 8% 1-octene, 2.3 M.I., and 0.917 gm./cc density, stearyl erucamide, and diatomaceous silica, the following data are obtained:

| Run | Amide ppm | Silica ppm | Heat Seal Range, °F. | Heat Seal Strength, lb. |
|---|---|---|---|---|
| 1 | none | none | 240–260 | 2.5 |
| 2 | none | 3500 | 240–260 | 2.8 |
| 3 | 3000 | 3500 | 240–260 | 2.6 |

Thus the amide and silica additives have no adverse effect on the heat-sealing of the polymer.

EXAMPLE 9

In similar manner to the above examples, a LLDPE of 8% 1-octene, 2.3 M.I., and 0.917 gm/cc density (A) was tested with finely-divided diatomaceous silica, stearyl erucamide (B) and erucyl erucamide (D). The data are as follows:

| Run | Polymer | Amide ppm | Silica ppm | Film to Film, COF Static | Kinetic | Ordinary Block, g |
|---|---|---|---|---|---|---|
| 1 | A | None | None | >1.40 | >1.40 | 60.0 |
| 2 | A | 2500,D | 3000 | 0.16 | 0.13 | 0.4 |
| 3 | A | 2500,B | 3000 | 0.22 | 0.19 | 2.7 |

EXAMPLE 10

In similar manner to the above examples, using LLDPE of 10% 1-butene, 2.1 MI and 0.918 g/cc density (C), LLDPE of 8% 1-octene, 2.3 MI and 0.917 g/cc density (A), stearyl erucamide and diatomaceous silica, the following data are obtained.

| Run | Polymer | Amide ppm | Silica ppm | Film to Film, COF Static | Kinetic | Induced Hot Block, g |
|---|---|---|---|---|---|---|
| 1 | A | None | None | >1.40 | >1.40 | 142.8 |
| 2 | C | None | None | >1.40 | >1.40 | 126.5 |
| 3 | C | 2500 | 3000 | 0.27 | 0.21 | 2.2 |

We claim:

1. A composition of matter comprising a blend of polymer, secondary fatty acid amide, and finely-divided naturally-occurring mineral,
   said polymer being characterized as one comprising ethylene copolymerized with a minor amount of at least one alpha, beta-ethylenically-unsaturated alkene having from 3 to 12 carbon atoms by the action of a coordination catalyst to produce a linear, low density copolymer having a density in the range of about 0.90 to about 0.94 gms./cc and a melt flow value in the range of about 0.1 gm./10 min. as measured by ASTM-D-1238(E) to about 20 gms./10 min. as measured by ASTM-D-1238(D).

2. The composition of claim 1 when used as a masterbatch for blending with additional polymer to produce a final blend containing an amide concentration in the range of about 0.05 to about 1.5 weight percent and a mineral concentration in the range of about 0.02 to about 2 weight percent.

3. The composition of claim 1 wherein the alkene is at least one selected from the group consisting of propylene, butene, isobutene, pentene, isopentene, hexene, isohexene, heptene, isoheptene, octene, isooctene, nonene, isononene, decene, and isodecene.

4. The composition of claim 1 wherein the alkene is at least one of octene, heptene, hexene, pentene, butene and propylene.

5. The composition of claim 1 wherein the secondary fatty acid amide conforms essentially to the empirical formula R—CO—NH—R', where R and R' each, independently, are saturated or unsaturated alkyl groups having 10 to 26 carbon atoms.

6. The composition of claim 1 wherein the finely-divided natural inorganic mineral comprises silica and/or diatomaceous earth having a surface area of about 0.7 to about 100 m$^2$/gm., an oil absorption value of about 21 to about 175 lbs. oil per 100 lbs. inorganic, and an average particle size of about 0.02 to about 40 microns.

7. The composition of claim 1 wherein the secondary fatty acid amide conforms essentially to the empirical formula R—CO—NH—R', where R and R' represent, independently, moieties selected from the group of fatty acids comprising erucyl, linoleyl, linolenyl, arachidonyl, palmitoleyl, elaidyl, vaccenyl, behenyl, arachidyl, stearyl, palmityl, lignoceryl, and oleyl.

8. The composition of claim 1 wherein the secondary fatty acid amide comprises at least one of stearyl erucylamide, erucyl erucylaminde, oleyl palmitamide, stearyl stearamide, and oleyl erucylamide.

9. The composition of claim 1 wherein the finely-divided natural mineral comprises talc.

10. The composition of claim 1 wherein the finely-divided natural mineral comprises limestone.

11. The composition of claim 1 wherein the finely-divided natural mineral comprises clay.

12. The composition of claim 1 wherein the incorporating of the amide and the mineral into the said copolymer comprises the use of a masterbatch of an ethylene polymer with amide and mineral mixed therein and the blending of said masterbatch with said copolymer to attain the desired amount of amide and mineral in the film produced therefrom.

13. The composition of claim 1 in the form of a thin sheet.

14. The composition of claim 1 in the form of a film having an average thickness in the range of about 0.3 to about 8 mils.

* * * * *

UNITED STATES PATENT AND TRADEMARK OFFICE
CERTIFICATE OF CORRECTION

PATENT NO. : 4,454,272

DATED : June 12, 1984

INVENTOR(S) : Osborne K. McKinney; David P. Flores

It is certified that error appears in the above—identified patent and that said Letters Patent is hereby corrected as shown below:

```
Col. 5, line 56 "bubles" should be --bubbles--.
Col. 9, line 14 "0.2" in Run 1 should be --60.2--.
Col. 10, line 67 "erucylaminde" should be --erucylamide--.
Claim 9, 1st line "finelydi-" should be --finely-di- --.
Claim 11, first line "finelydi-" should be --finely-di- --.
```

Signed and Sealed this

First Day of January 1985

[SEAL]

Attest:

GERALD J. MOSSINGHOFF

Attesting Officer     Commissioner of Patents and Trademarks